United States Patent

Schwob et al.

[11] Patent Number: 6,099,696
[45] Date of Patent: Aug. 8, 2000

[54] CONVERSION OF CARBON OR CARBON-CONTAINING COMPOUNDS IN A PLASMA

[75] Inventors: Yvan Schwob, Cannes, France; Francis Fischer, Sins, Switzerland; Laurent Fulcheri, Opio; Pierre Willemez, Le Cannet, both of France

[73] Assignees: Armines, Paris, France; Timcal Ltd., Bodio, Switzerland

[21] Appl. No.: 08/495,626

[22] PCT Filed: Feb. 4, 1994

[86] PCT No.: PCT/EP94/00321

§ 371 Date: Oct. 13, 1995

§ 102(e) Date: Oct. 13, 1995

[87] PCT Pub. No.: WO94/17908

PCT Pub. Date: Aug. 18, 1994

[30] Foreign Application Priority Data

Feb. 5, 1993 [FR] France ................................. 93 01554

[51] Int. Cl.[7] .................................................. C01B 31/00
[52] U.S. Cl. .................... 204/173; 422/186.26; 423/448; 423/449.1; 423/449.6; 423/450; 423/445 B
[58] Field of Search .................. 204/173; 422/186.22, 422/186.23, 186.26, 906; 423/448, 449.1, 449.6, 450, 445 B

[56] References Cited

U.S. PATENT DOCUMENTS 3,009,783  11/1961  Sheer et al. ........................... 204/173
3,989,512  11/1976  Sayce ..................................... 423/335
4,472,254   9/1984  Dotson et al. ......................... 204/164
5,227,038   7/1993  Smalley et al. ....................... 204/173
5,395,496   3/1995  Tsantrizos et al. .................... 204/173

FOREIGN PATENT DOCUMENTS 2 562 902  10/1985  European Pat. Off. .
  211 457   7/1984  Germany .
276 098 A1  2/1990  Germany .
292 920 A5  8/1991  Germany .

OTHER PUBLICATIONS

Database WPI Week 937, Derwent Publications Ltd., London, GB, AN 93–055086 & JP, A, 5 004 810 (Semiconductor Energy Lab.), Jan. 1994.

International Publication No. WO 86/02024, published Apr. 1986.

*Primary Examiner*—Arun S. Phasge
*Assistant Examiner*—Kishor Mayekar
*Attorney, Agent, or Firm*—Fisher, Christen & Sabol

[57] ABSTRACT

A process for converting carbon or carbonated compounds in a plasma into carbons having a defined nanostructure consists of a reaction chamber whose head part contains three electrodes, a plasma gas supply, and a carbon or carbonated compound supply. A process for preparing carbons having a defined nanostructure. Apparatus to carry out the processes.

6 Claims, 4 Drawing Sheets

CONVERSION OF CARBON OR CARBON-CONTAINING COMPOUNDS IN A PLASMA

BACKGROUND OF THE INVENTION

1. Field of the Invention

The invention relates to an apparatus and a method for the conversion of carbon or carbon-containing compounds in a plasma to carbons having a defined nanostructure.

2. Background Art

The production of carbon, for example soots, from carbon or carbon-containing compounds such as, for example, from hydrocarbons in a plasma is known. Thus, for example, GDR Patent Specifications 292 920, 276 098 and 211 457 relate to the production of soot by cracking hydrocarbons, for example methane, in a hydrogen plasma. The cracking is carried out in a so-called plasmatron (for figure see GDR Patent Specification 211 457) in which a hydrogen plasma jet heated to 3500 to 4000 K cracks the injected hydrocarbon. This apparatus can be described as a standard apparatus for the plasma-chemical production of soots from hydrocarbons. The apparatus mentioned and the methods associated therewith are consequently completely suitable for producing the standard carbons such as soot in a reasonable quality. As current knowledge shows, the carbons which can be produced by the known methods, in particular the soots, are not composed, however, of uniform structures but manifest themselves as a wide distribution of different carbon particles having markedly different nanostructure (shown in FIG. 4 as number of particles as a function of the spacing, c/2, between the planes of the layers in pm). The application characteristics of, for example, a soot produced in accordance with the prior art are consequently the result of an average of the characteristics of the different particles. This is unsatisfactory insofar as particular characteristics of carbon particles having defined nanostructure have hitherto not been available.

On the other hand, a controlled production of such carbons with a narrow distribution of carbon particles, i.e. having defined nanostructure, is not achievable with the known apparatuses from the prior art since it is not possible to produce a controllable and homogeneous plasma zone.

BROAD DESCRIPTION OF THE INVENTION

The object was therefore to develop an apparatus which makes it possible to produce very precisely controllable plasma conditions. The object was furthermore to develop a process with the aid of the apparatus which makes it possible to produce carbons having defined nanostructure.

According to the invention, it was possible to achieve the object with the apparatus according to the invention and the corresponding method of the invention.

DETAILED DESCRIPTION OF THE INVENTION

Figure 1:
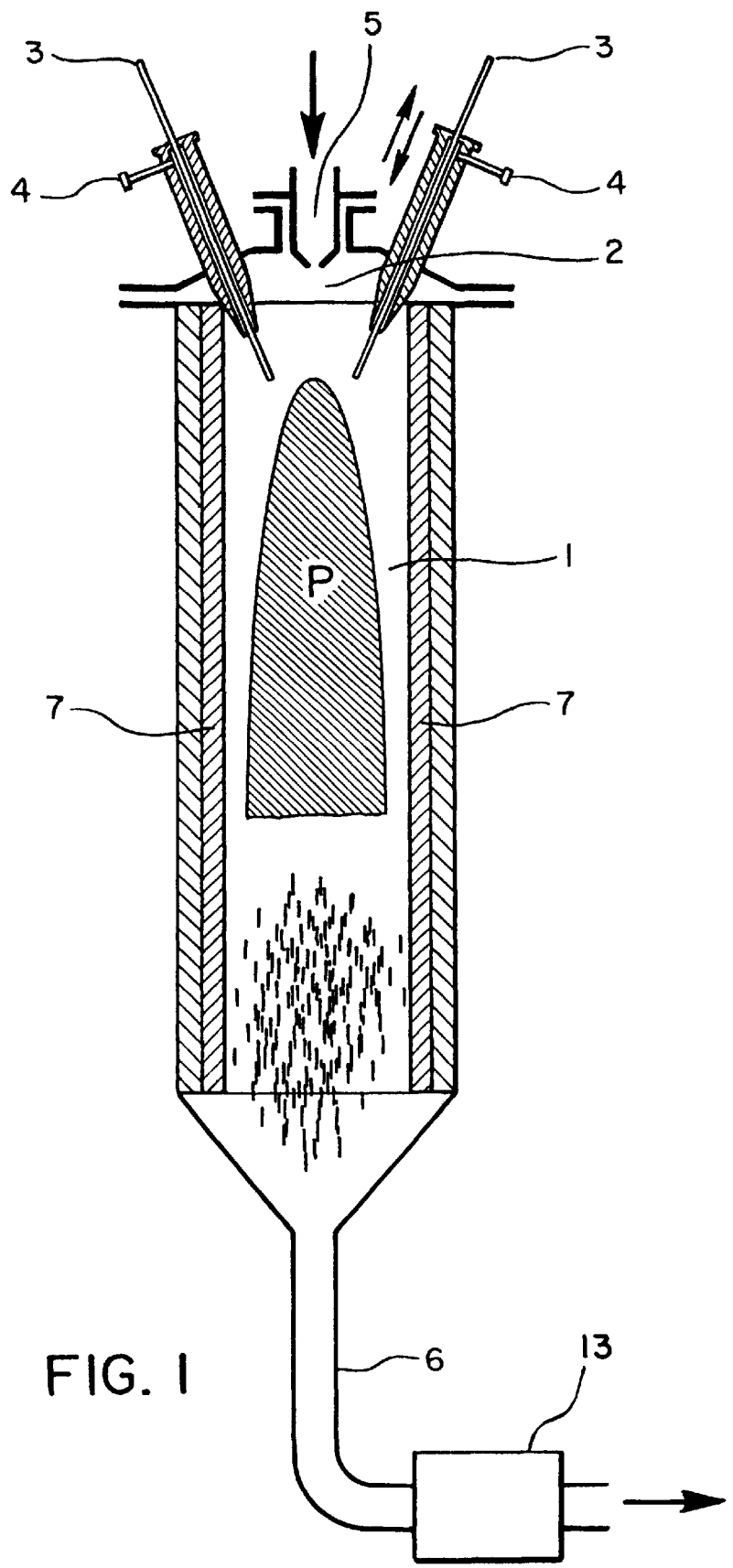
FIG. 1 shows a first embodiment of the apparatus. Of the three electrodes present, only two are shown.

The apparatus according to the invention comprises a heat-resistant reaction chamber 1 having a thermally insulating lining, in whose head section 2

- three electrodes 3 are disposed at an angle to the axis of the apparatus so that the projected axes form an intersection in the upper section of the reaction chamber 1,
- a feed device for the plasma gas 4 is provided so that the plasma gas is fed directly to the electrodes 3,
- a feed device for the carbon or the carbon-containing compound 5 is disposed so that a targeted supply is made possible to the plasma zone P formed between the electrodes 3, and in whose base section the product outlet 6 is provided.

The reaction chamber 1 is expediently of cylindrical design. The insulation 7 of the walls of the reaction chamber is advantageously composed of graphite and, optionally, of an additional ceramic layer. Furthermore, an additional liquid-cooled double wall, which is not shown in greater detail, may be provided.

The three electrodes disposed in the head section have an alternating-voltage connection of expediently 50 to 400 V. They are expediently distributed at a uniform spacing (120°) and advantageously have an angle to the vertical axis of the apparatus of expediently 15°–90°, preferably of approximately 60°. This guarantees that the projected electrode axes form an imaginary intersection in the upper section of the reaction chamber.

The electrodes are infinitely adjustable by means of a suitable control unit, preferably individually, in their axial direction. This is important, in particular, since, to strike the arc, the electrodes are brought closer together and positioned immediately after striking has occurred in such a way that the desired stable and homogeneous plasma zone is obtained. The electrodes are automatically readjusted in accordance with the erosion of the electrodes. Carbon or graphite, preferably graphite, is used as electrode material.

Figure 3:
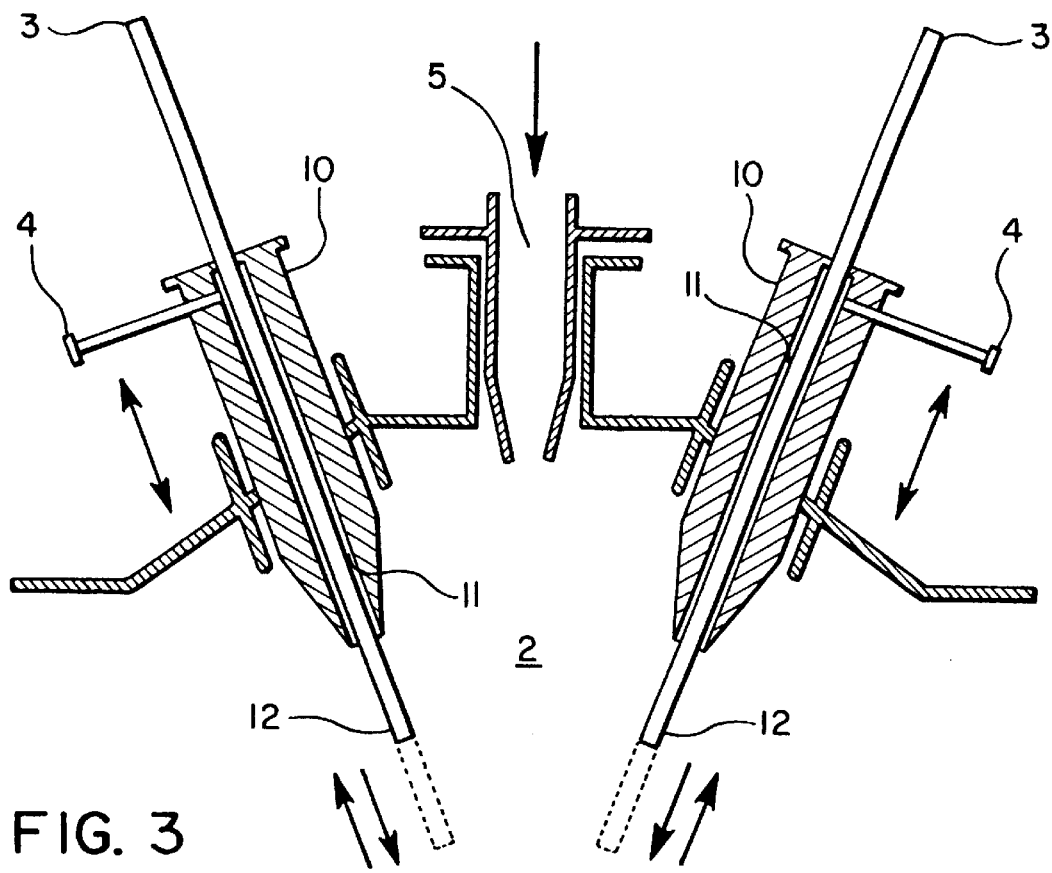
FIG. 3 shows a portion of the head section of the apparatus. Of the three electrodes present only two are shown.
Figure 6:
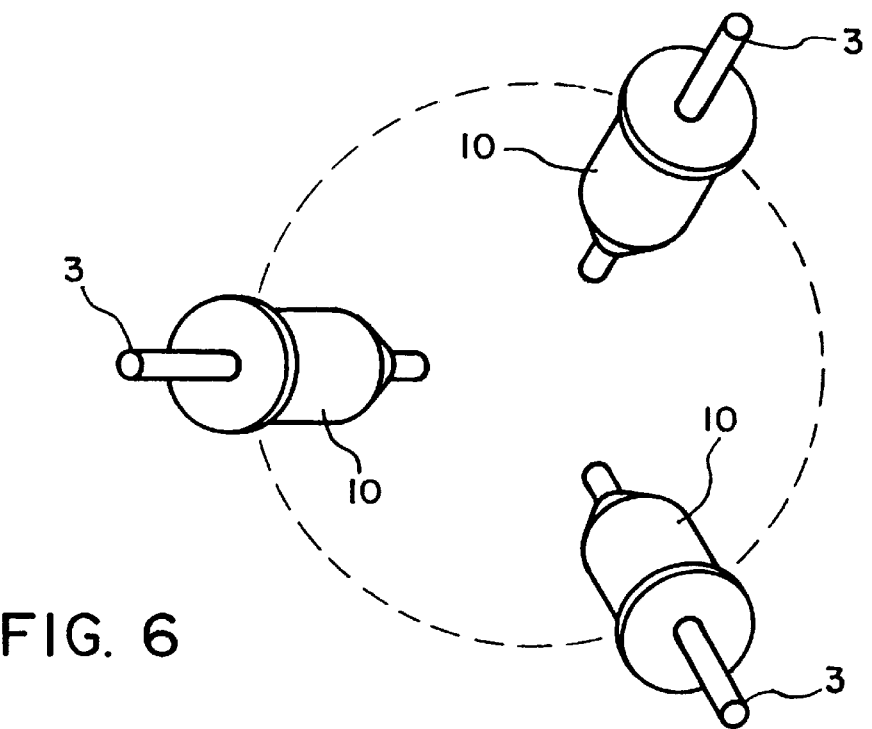
FIG. 6 shows the arrangement of three electrodes.

In a preferred embodiment, the supply of the plasma gas 4 is effected according to FIG. 3 by a casing tube 10 enclosing the electrodes 3. Said casing tube 10 encloses the electrodes 3 generously enough for a cylindrical gap 11 to be available for the supply of the plasma gas between casing tube 10 and electrode 3. advantageously, said casing tube 10 terminates, optionally with a slight taper towards the electrode, at a distance upstream of the electrode tip 12 which is such that the function of the electrode is not impaired. This device makes possible an optimum supply of the plasma gas to the electrodes.

The supply device for the carbon or the carbon-containing compound 5 can expediently be designed so that substances can be supplied in all the states of aggregation. However, all the usual feed devices for exclusively gaseous, liquid or solid starting materials can, of course, also be used. The important point is that the feed device 5 permits the starting substances to be introduced in a targeted manner and in a finely dispersed form into the plasma zone P. It is therefore advantageously provided centrally in the head section 2 of the apparatus according to the invention.

Depending on the chosen plasma conditions and, consequently, depending on the carbon formed, a rapid or a slow cooling should be provided.

Accordingly, one or more cooling devices can be disposed in the lower section of the reaction chamber and/or adjacent to the reaction chamber. Thus, in a special embodiment according to FIG. 2, a feed device 8 for an agent for rapidly cooling (quenching agent) the carbon formed can be expediently provided below the plasma zone P between the upper and lower section of the reaction chamber 1. Said feed device is expediently designed as a nozzle which makes it possible to spray a liquid or gaseous quenching agent finely into the reaction chamber 1. Alternatively, or additionally, the lower section of the reaction chamber 1 may also be provided with a liquid-cooled casing 9 which makes an additional heat dissipation possible. Again, in a further special embodiment, which is not, however, shown in greater detail, a separate cooling device, for example in the form of heat exchangers, can be disposed adjacently to the reaction chamber 1, which heat exchangers may also be fed with a quenching agent.

Finally, the carbon formed can be separated off by means of a standard separating device for carbon, which is not shown in greater detail. Advantageously, the separating device is composed of a temperature-resistant material. For example, glass frits, ceramic filters or filters composed of carbon-fibre material or PTFE have therefore proved satisfactory.

In the production of fullerenes, the separation can be carried out in a known manner by extraction with a suitable solvent.

A central control unit which makes it possible, for example, to position the electrodes and to monitor and influence centrally the energy supply, the supply of plasma gas, the supply of carbon or of the carbon-containing agent and, optionally, of the quenching agent is also not shown in greater detail.

The apparatus according to the invention has an efficiency in the order of magnitude of over 90% and is consequently also far superior to the apparatuses from the prior art (GDR Patent Specification 292 920, 80%) from the economic point of view.

The invention furthermore relates to a method of producing carbons having defined nanostructure using the apparatus according to the invention disclosed above.

According to the invention, to generate the plasma, a plasma gas is required. In principle, all the gases known in the prior art, such as, for example, hydrogen, nitrogen or the noble gases helium, neon or argon, can be used as plasma gases. Preferred plasma gas is hydrogen.

Suitable for conversion in the plasma are carbon and carbon-containing compounds, it being quite possible to use mixtures of the starting substances mentioned.

Carbon is understood to mean soots or graphites whose nanostructure is unsatisfactory and which are intended therefore to undergo a quality improvement through the plasma process according to the invention. Carbon-containing compounds are understood as meaning gaseous, liquid or solid, saturated or unsaturated aliphatic or aromatic hydrocarbons. By way of example, mention may be made of the alkanes or alkenes containing 1 to 20 C atoms, such as methane, ethane, ethylene or butadiene, or the aromatics benzene, styrene, naphthalene or anthracene. Polymers of aliphatic or aromatic olefins, for example polyethylene, polypropylene or polystyrene, are also suitable.

Expediently, the procedure is that the plasma gas is first fed to the electrodes 3 by the corresponding feed device 4, the electrodes 3 are then made to strike the arc and after striking has taken place, they are returned to the desired position. To maintain the stability of the arc and consequently to maintain a uniform plasma zone P, the electrodes are automatically readjusted in accordance with their erosion/consumption. Critical for a controlled production of carbons having defined nanostructure is a very precise adjustment of the plasma conditions, in particular the plasma temperature, which are different in each case. The plasma temperature cannot as a rule be measured directly, but can essentially be calculated precisely and controlled accordingly via the energy supplied and the amount of carbon or carbon-containing compound supplied. The energy supplied is in turn dependent on the enthalpy of formation of the starting product and on the amount of plasma gas supplied and can consequently also be determined exactly by known physico-chemical methods. Normally the energy supplied varies in the range from 40 kw/h to 150 kW/h, preferably between 50 kW/h and 100 kW/h. The starting compounds mentioned are expediently distributed centrally in the plasma zone by means of the feed device 5.

A plasma temperature in the range 3000–3500° C. is required to produce a graphite having defined nanostructure.

A plasma temperature in the range 2000–3000° C. is necessary to produce an acetylene soot having defined nanostructure and a plasma temperature of 1200–2000° C. is needed to produce a soot having defined nanostructure. Finally, fullerenes are formed at temperatures in the range 3500–4500° C.

For the purpose of cooling, one of the cooling devices mentioned is provided to suit the product formed. Thus, a cooling rate of 800 K/s to 1500 K/s should be used for an acetylene soot or a soot and a cooling rate of 1000 K/s to 2500 K/s for fullerenes. As a rule, no special cooling measures are necessary for graphite since the cooling which occurs automatically in the lower section of the reaction chamber and at the outlet is adequate.

The hydrogen formed in the plasma reaction is advantageously collected and reused, for example, as coolant after suitable precooling.

Figure 2:
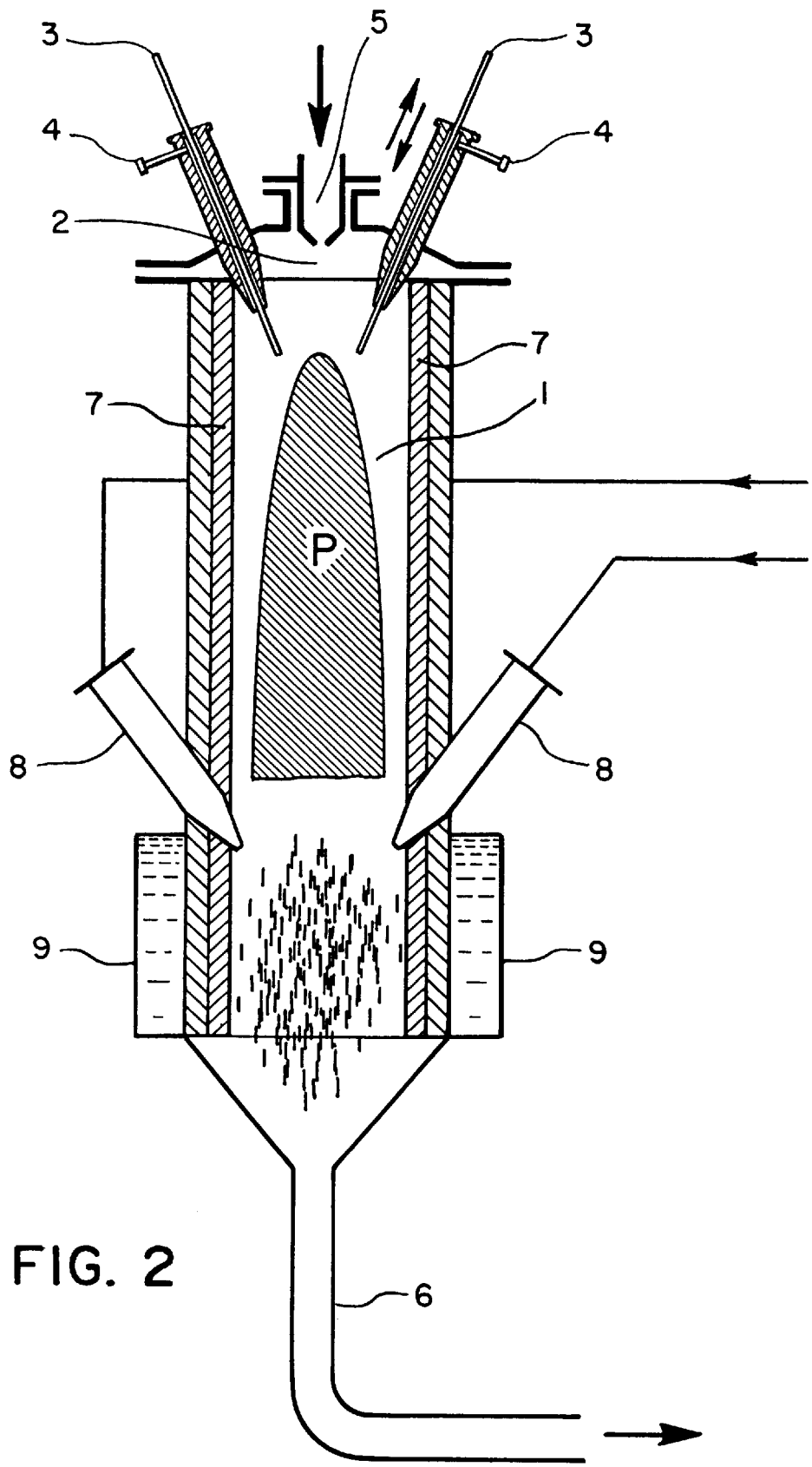
FIG. 2 shows a second embodiment of the apparatus with a feed device for rapidly cooling the carbon formed.

As shown in FIG. 2, the cooling can, for example, be carried out in such a way that a precooled inert gas such as, for example, nitrogen or hydrogen is introduced below the plasma zone P via the feed device 8, which is designed, for example, as nozzles, after which the carbon formed is subjected to a very rapid cooling (quenching). The inert gas used in this connection is preferably hydrogen formed in the plasma reaction and then recycled.

The dwell time in the reaction chamber of the carbons formed is approximately 2 to 10 s.

After cooling has taken place, the carbon formed can be worked up in the normal skilled manner of the art in the separation apparatus mentioned and then supplied for its further use.

The carbons produced by the method according to the invention and having defined nanostructure are unknown and are therefore also a constituent part of the invention. Accordingly, these carbons are notable for a narrow distribution of carbon particles having defined nanostructure (shown in FIG. 5 as number of particles as a function of the spacing between the planes of the layers). The width of the distribution of the carbon particles is revealed by the calculation of the standard deviation.

EXAMPLES

In the following examples, an apparatus essentially according to FIG. 2 is used (diameter of reaction chamber 50 cm, height of the reaction chamber 200 cm). The apparatus was controlled so that a power of 50 kW (L1) or 100 kW (L2) was available in the plasma zone. The efficiency of the system was 92% (L1) and 96% (L2).

Hydrogen was used as plasma gas.

The hydrogen formed was recycled.

Table 1 shows the method parameters for the conversions carried out.

Table 2 contains the characterization of the products obtained.

TABLE 1

| Ex. | Starting product | Power | Amounts supplied Nm³/h *kg/h | Plasma temperature °C. | Cooling rate, K/s | Product |
|---|---|---|---|---|---|---|
| 1 | Methane | L1 | 37.2 | 2500 | 1000 | 4.5 kg/h acetylene soot |
| 2 | Methane | L1 | 52 | 1500 | 900 | 7.2 kg/h soot |
| 3 | Methane | L1 | 61 | 1500 | 900 | 8.1 kg/h soot |
| 4 | Methane | L2 | 17.2 | 2600 | 1000 | 9 kg/h acetylene soot |
| 5 | Methane | L2 | 37.2 | 1500 | 800 | 20 kg/h soot |
| 6 | Methane | L2 | 8 | 3500 | 2500 | 4.2 kg/h soot (fullerene content 8%) |
| 7 | Ethylene | L2 | 25 | 2600 | 1200 | 27 kg/h acetylene soot |
| 8 | Butadiene | L2 | 15.2 | 2600 | 900 | 33 kg/h acetylene soot |
| 9 | Butadiene | L2 | 56 | 1500 | 800 | 124 kg/h soot |
| 10 | Benzene | L2 | *43 | 2600 | 1000 | 40 kg/h acetylene soot |
| 11 | Polyethylene[1] | L2 | *17.4 | 2600 | 1100 | 14.9 kg/h acetylene soot |
| 12 | Graphite | L2 | *2 | 4000 | 2500 | 2 kg/h soot (fullerene content 12%) |

[1]LACQTENE-2110-MN50 (ATOCHEM)

TABLE 2

Figure 4:
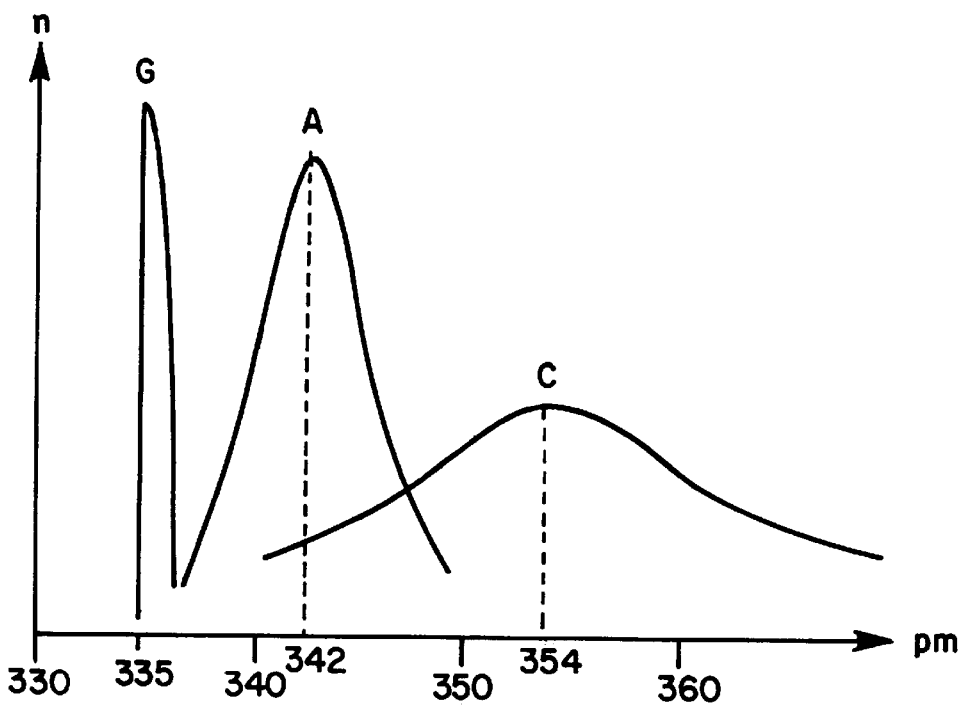
FIG. 4 shows distribution curves which represent the number of particles as a function of the spacing, c/2, between the planes of the layers for carbons from the prior art (G=graphite, A=acetylene soot, C=soot).
Figure 5:
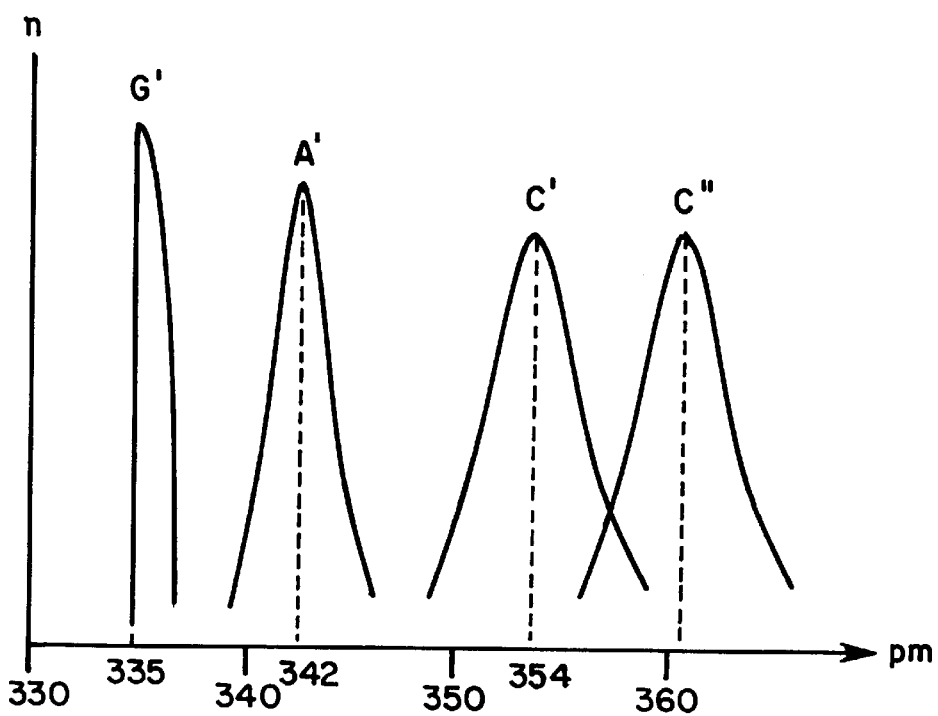
FIG. 5 shows distribution curves corresponding to FIG. 4 which represent the carbons having defined nanostructure produced by the method according to the invention. G=graphite, A'=acetylene soot, C', C"=soots.

| Example | Curve correlation, FIG. 5 | Mean spacing, c/2, between planes of layers (n/m) | Standard deviation |
|---|---|---|---|
| A (FIG. 4, comparison) | | 342 | 8 |
| C (FIG. 4, comparison) | | 354 | 15 |
| 1 | A' | 342 | 6 |
| 2 | C' | 354 | 5 |
| 3 | C" | 360 | 6 |
| 4 | A' | 342 | 5 |
| 5 | C' | 357 | 6 |
| 6 | Fullerene | — | — |
| 7 | A' | 340 | 5 |
| 8 | A' | 341 | 4 |
| 9 | C' | 356 | 5 |
| 10 | A' | 346 | 4 |
| 11 | A' | 343 | 6 |
| 12 | Fullerene | — | — |

What is claimed is:

1. A method of producing a graphite having defined nanostructure, an acetylene soot having defined nanostructure, a soot having defined nanostructure or fullerenes, said method comprising:
   (i) providing an apparatus comprising a heat resistant reaction chamber (1) with a thermally insulating lining, in whose head section (2) contains:
      (a) three electrodes (3) disposed at an angle to axis of the apparatus such that projected axes of the electrodes form an intersection in upper section of the reaction chamber (1) and the electrodes (3) are individually infinitely adjustable in direction of the axes thereof,
      (b) means (4) for feeding plasma gas directly to each of the electrodes (3),
      (c) means (5) for feeding a substance composed of carbon, a hydrocarbon, or a mixture of carbon and a hydrocarbon, said means (5) disposed such that a targeted supply is made possible to plasma zone (P) which is formed between the electrodes (3), and
   in whose base section (6) contains a product outlet,
   (ii) introducing a plasma gas into the reaction chamber (1) from each of the plasma gas feed means (4),
   (iii) applying an alternating current to each of the electrodes (3) to strike an arc and to form a plasma zone (P),
   (iv) maintaining the plasma zone (P) uniform,
   (v) targeting a substance composed of carbon, a hydrocarbon, or a mixture of carbon and a hydrocarbon, in a finely dispersed form into the uniform plasma zone (P) from each of the substance feed means (5),
   (vi) controlling the plasma to a temperature to produce a plasma product which is:
      primarily said graphite having defined nanostructure, when the plasma temperature is controlled between 3,000° and 3,500° C.,
      primarily said acetylene soot having defined nanostructure, when the plasma temperature is controlled between 2,000° and 3,000° C.,
      primarily said soot having defined nanostructure, when the plasma temperature is controlled between 1,200° and 2,000° C., or
      primarily said fullerenes, when the plasma temperature is controlled between 3,500° and 4,500° C., and,
   (vii) collecting the product at the product outlet.

2. The method according to claim 1 wherein hydrogen, nitrogen or a noble gas is used as the plasma gas.

3. The method according to claim 2 wherein hydrogen is used.

4. The method according to claim 1 comprising the further step of recycling hydrogen formed in the production of the plasma product.

5. The method according to claim 4 wherein gaseous, liquid or solid aliphatic or aromatic hydrocarbons or polymers of aliphatic or aromatic olefins are used as said hydrocarbons.

6. The method according to claim 1 wherein the plasma temperature is in the temperature range of 3,500° to 4,500° C.

* * * * *